United States Patent
Kim et al.

(10) Patent No.: US 8,363,988 B2
(45) Date of Patent: Jan. 29, 2013

(54) OPTO-ELECTRONIC CONNECTOR MODULE AND OPTO-ELECTRONIC COMMUNICATION MODULE HAVING THE SAME

(75) Inventors: Jin Tae Kim, Daejeon (KR); Jung Jin Ju, Daejeon (KR); Sun Tak Park, Daejeon (KR); Seung Koo Park, Daejeon (KR); Min Su Kim, Daejeon (KR); Myung Hyun Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 689 days.

(21) Appl. No.: 11/837,891

(22) Filed: Aug. 13, 2007

(65) Prior Publication Data

US 2008/0080807 A1     Apr. 3, 2008

(30) Foreign Application Priority Data

Sep. 29, 2006    (KR) .................. 10-2006-0096414

(51) Int. Cl.
    *G02B 6/12*     (2006.01)
(52) U.S. Cl. ........................................ 385/14
(58) Field of Classification Search ............ 385/14
See application file for complete search history.

(56) References Cited

U.S. PATENT DOCUMENTS

| | | | |
|---|---|---|---|
| 6,285,808 B1 | 9/2001 | Mehlhorn et al. | |
| 6,504,107 B1 * | 1/2003 | Kragl | 174/260 |
| 6,801,691 B2 * | 10/2004 | Berini | 385/39 |
| 6,885,788 B2 | 4/2005 | Iwaki et al. | |
| 2005/0123231 A1 | 6/2005 | Niitsu et al. | |
| 2005/0156304 A1 * | 7/2005 | Furuyama et al. | 257/686 |
| 2006/0192278 A1 | 8/2006 | Furuyama et al. | |
| 2006/0193565 A1 | 8/2006 | Sasaki et al. | |

FOREIGN PATENT DOCUMENTS

| | | |
|---|---|---|
| JP | 2006-030868 | 2/2006 |
| KR | 1993-0013765 | 7/1993 |
| KR | 1999-020940 | 3/1999 |
| KR | 10-2004-0033714 | 4/2004 |

* cited by examiner

*Primary Examiner* — Uyen Chau N Le
*Assistant Examiner* — John M Bedtelyon
(74) *Attorney, Agent, or Firm* — Rabin & Berdo, P.C.

(57) ABSTRACT

An opto-electronic connector module includes an optical waveguide portion including an optical waveguide in which an optical signal is transmitted, and a connector portion coupled to the optical waveguide portion, fixing the optical waveguide portion on a PCB on which a semiconductor chip portion having an opto-electronic device and a semiconductor chip is surface-mounted, and having a first coupling portion having a convex or concave structure formed in a lower portion thereof. The first coupling portion of the connector portion is coupled to a second coupling portion having a concave or convex structure formed on an upper surface of the PCB.

31 Claims, 8 Drawing Sheets

OPTO-ELECTRONIC CONNECTOR MODULE AND OPTO-ELECTRONIC COMMUNICATION MODULE HAVING THE SAME

CROSS-REFERENCE TO RELATED PATENT APPLICATIONS

This application claims the benefit of Korean Patent Application No. 10-2006-0096414, filed on Sep. 29, 2006, in the Korean Intellectual Property Office, the disclosure of which is incorporated herein in its entirety by reference.

BACKGROUND OF THE INVENTION

1. Field of the Invention

The present invention relates to an optical communication module, and more particularly, to an opto-electronic connector module which enables high speed information exchange between semiconductor chips and an opto-electronic communication module having the connector module.

2. Description of the Related Art

The conventional high speed signal process based on a copper wire has a limit in information processing speed due to electromagnetic interference (EMI) between adjacent signals, impedance imbalance, and signal skew. Recently, an information processing technology using light is highlighted as a solution to solve the problem of the copper wires.

The information processing technology using light can be variously embodied according to devices that transmit or receive optical signals and a combined structure thereof. The combined structure includes in common a transmitting portion transmitting information, a transfer portion transferring an optical signal, and a receiving portion receiving the transmitted information. The transmitting portion includes a drive converting an electrical signal to an optical signal and a light emitting device generating the optical signal. The receiving portion includes a light receiving device detecting light and an amplifier amplifying an electric signal of the detected light. The transfer portion includes optical fiber or optical waveguide device transferring the optical signal.

In the information processing technology using light, for signal transfer with high efficiency and high signal integrity, a low loss light coupling method between the light emitting device or light receiving device (hereinafter, referred to as the opto-electronic device) and the transfer portion has been actively studied. Recently, a variety of low loss light coupling methods such as butt coupling, 45 degrees reflective mirror coupling, or free space light coupling is being developed.

However, theses light coupling methods have demerits in that, as the number of channels increases, time and technical consumption invested in the optical alignment between the opto-electronic device and the light transfer portion increases proportionally. Also, in a packaging step, an optical communication structure needs to be embodied between semiconductor chips. It is considerably difficult in view of size and optical alignment when the light communication structure is applied for chips based on a semiconductor process. Furthermore, since an optical waveguide that is being presently used is relatively larger than the chip, a space over tens of microns or almost 100 microns per channel is required so that, in spite of a decrease in the line width in a semiconductor chip, there is a limit in the improvement of channel integration.

In addition, in the conventional information processing technology using light, since the optical communication structure between semiconductor chips manages only the transfer of an optical signal and a separately manufactured electric wiring manages an electric signal between semiconductor chips, it is not economical in the manufacturing and integration of a communication module.

SUMMARY OF THE INVENTION

To solve the above and/or other problems, the present invention provides an opto-electronic connector module which can simplify optical alignment between the opto-electronic device and the light transfer portion between semiconductor chips and realize efficient and highly integrated optical communication structure.

The present invention provides an opto-electronic connector module which can simultaneously performing optical and electric communication between semiconductor chips by including electric wirings in the optical communication structure, and an opto-electronic communication module having the connector module.

According to an aspect of the present invention, an opto-electronic connector module comprises an optical waveguide portion including an optical waveguide in which an optical signal is transmitted, and a connector portion coupled to the optical waveguide portion, fixing the optical waveguide portion on a PCB on which a semiconductor chip portion having an opto-electronic device and a semiconductor chip is surface-mounted, and having a first coupling portion having a convex or concave structure formed in a lower portion thereof, wherein the first coupling portion of the connector portion is coupled to a second coupling portion having a concave or convex structure formed on an upper surface of the PCB.

A first electric wiring capable of transferring an electric signal of the semiconductor chip may be formed at the optical waveguide portion.

The first electric wiring may extend to the first coupling portion of the connector portion and the first electric wiring is connected to the semiconductor chip via the first coupling portion of the connector portion and a second electric wiring that is formed on the upper surface of the PCB and connects the semiconductor chip and the second coupling portion.

The optical waveguide portion may be fixed to the PCB by the coupling between the first coupling portion and the second coupling portion and the optical waveguide is vertically and horizontally optical-aligned to the opto-electronic device.

The optical waveguide may be a metal optical waveguide or a core-clad based optical waveguide.

The optical waveguide may be flexible.

The optical waveguide portion may include a metal optical waveguide in which an optical signal is transferred and a polymer optical material enclosing the metal optical waveguide.

The metal optical waveguide may have a thickness of 5 through 200 nm and a width of 2 through 100 μm The optical waveguide may be a core-clad based optical waveguide and the core-clad based optical waveguide may be formed of a polymer optical material including a halogen element or heavy hydrogen.

The second coupling portion may be formed on a chip fixing plate that is formed on an upper surface of the PCB and fixes the semiconductor chip portion by mounting the semiconductor chip portion on the PCB.

The first coupling portion of the connector portion and second coupling portions of the chip fixing plate may have a snap fastener structure to prevent detachment after coupling.

According to another aspect of the present invention, an opto-electronic communication module comprises a PCB, a semiconductor chip portion including a semiconductor chip and an opto-electronic device mounted on the PCB, and an opto-electronic connector module including an optical waveguide portion including an optical waveguide in which an optical signal is transmitted, and a connector portion coupled to the optical waveguide portion, fixing the optical waveguide portion on the PCB, and having a first coupling portion having a convex or concave structure formed in a lower portion thereof, wherein the first coupling portion of the connector portion is coupled to a second coupling portion having a concave or convex structure formed on an upper surface of the PCB.

The opto-electronic device may be a light emitting device or a light receiving device, and the semiconductor chip portion is configured as the opto-electronic device is integrated with a semiconductor chip or the opto-electronic device is separately manufactured and coupled to the semiconductor chip.

The semiconductor chip portion may be formed of devices selected from a semiconductor communication device group consisting of the opto-electronic device, an optical device drive, an amplifier, a microprocessor, a microprocessor chipset, a memory, and a network support chipset, and the semiconductor chip portion is configured in form of a set of unit chips of devices selected from the semiconductor communication device group or in a unit chipset in which the respective devices are integrated together.

The opto-electronic communication module may further comprise a chip fixing plate formed on an upper surface of the PCB, mounting and fixing the semiconductor chip portion on the PCB, and having the second coupling portion formed thereon.

The chip fixing plate may be formed of polymer.

The first coupling portion of the connector portion and the second coupling portion of the chip fixing plate may have a snap fastener structure to prevent detachment after coupling.

A first electric wiring capable of transferring an electric signal of the semiconductor chip portion may be formed on the optical waveguide or the PCB.

The first electric wiring may extend to the first coupling portion of the connector portion and the first electric wiring is connected to the semiconductor chip via the first coupling portion of the connector portion and a second electric wiring that is formed on the upper surface of the PCB and connects the semiconductor chip and the second coupling portion.

The opto-electronic communication module may further comprise a chip fixing plate formed on the upper surface of the PCB, fixing the semiconductor chip portion by mounting the semiconductor chip portion on the PCB, and having the second coupling portion formed thereon, wherein the second electric wiring is formed in the chip fixing plate.

The second electric wiring may extend outside the chip fixing plate so that an external signal is applied to the second electric wiring.

The coupling of the first and second coupling portions may fix the optical waveguide portion at the PCB and allows the optical waveguide to be vertically and horizontally optical-aligned with respect to the opto-electronic device.

The optical waveguide may be a metal optical waveguide or a core-clad based optical waveguide.

The optical waveguide may be flexible.

The optical waveguide portion may include a metal optical waveguide in which an optical signal is transferred and a polymer optical material enclosing the metal optical waveguide.

The metal optical waveguide may have a thickness of 5 through 200 nm and a width of 2 through 100 μm The optical waveguide may be a core-clad based optical waveguide and the core-clad based optical waveguide may be formed of a polymer optical material including a halogen element or heavy hydrogen.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE INVENTION

Figure 1A:
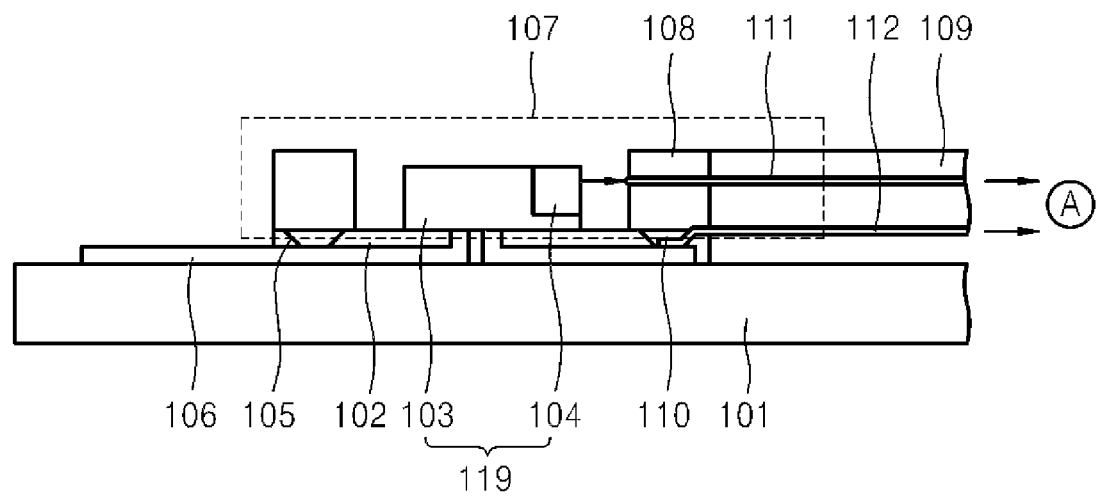
FIGS. 1A and 1B are sectional view of an opto-electronic connector module according to an embodiment of the present invention.

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art. In the drawings, the thicknesses of layers and regions are exaggerated for clarity. It will also be understood that when a layer is referred to as being "on" another layer or substrate, it can be directly on the other layer or substrate, or intervening layers may also be present. Like reference numerals in the drawings denote like elements, and thus their description will be omitted.

Figure 1B:
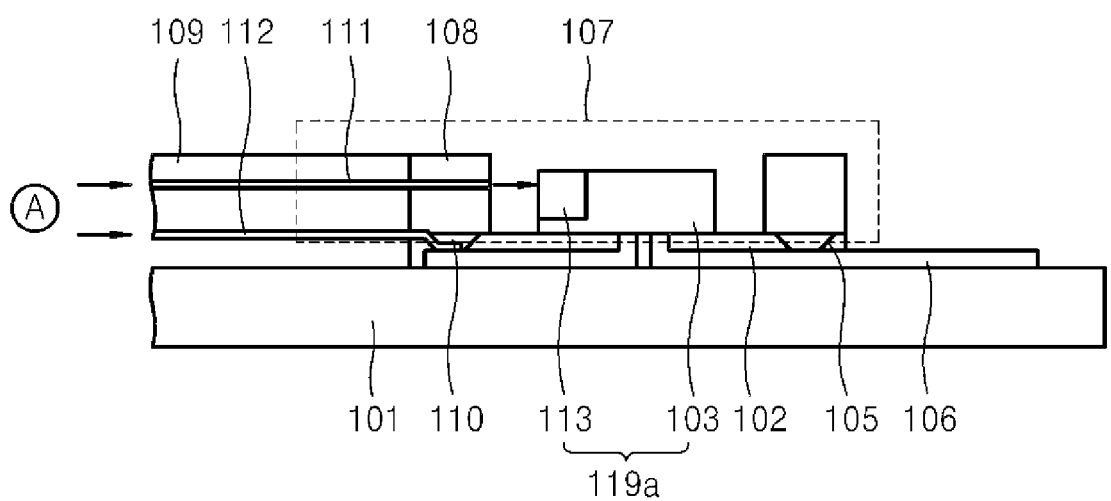

FIGS. 1A and 1B are sectional view of an opto-electronic connector module according to an embodiment of the present invention. FIG. 1A illustrates that a semiconductor chip portion of a transmitting portion including a light emitting device is optically and electrically connected to the opto-electronic connector module. FIG. 1B illustrates that a semiconductor chip portion of a receiving portion including a light receiving device is optically and electrically connected to the opto-electronic connector module.

Figure 3A:
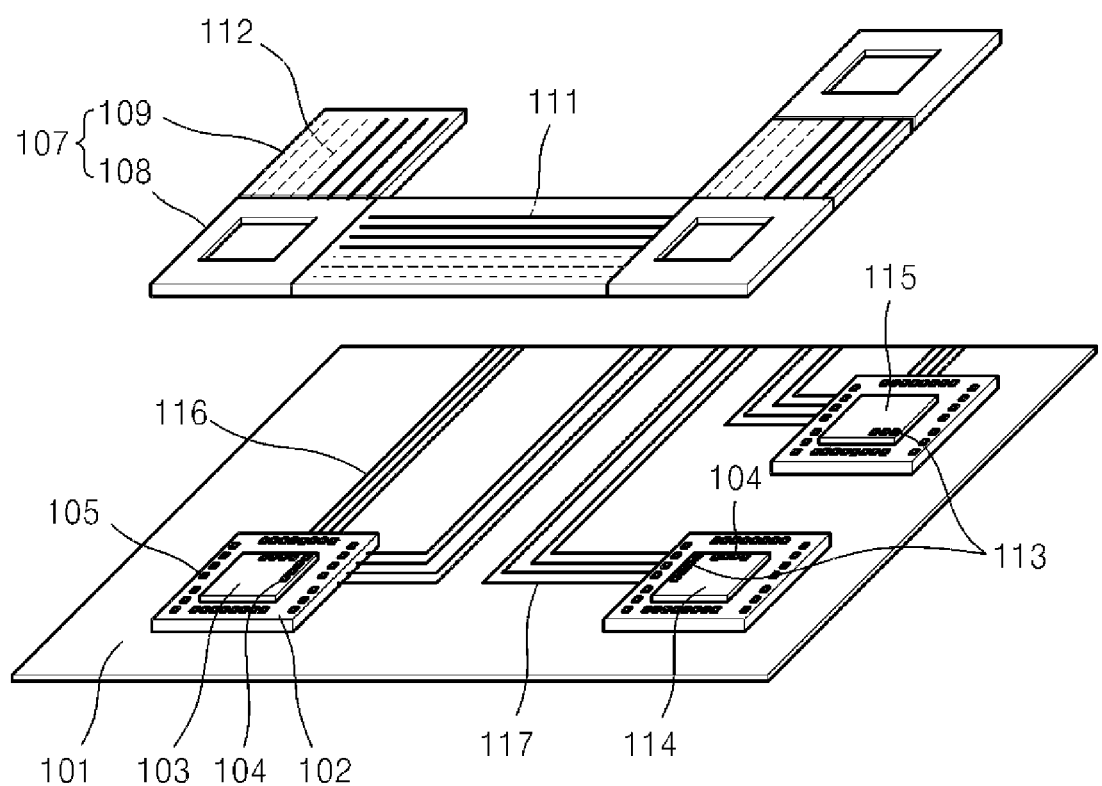
FIG. 3A is a perspective view of an opto-electronic communication module according to another embodiment of the present invention which is optically and electrically connected between a plurality of semiconductor chips using the opto-electronic connector module of FIG. 2A.
Figure 5A:
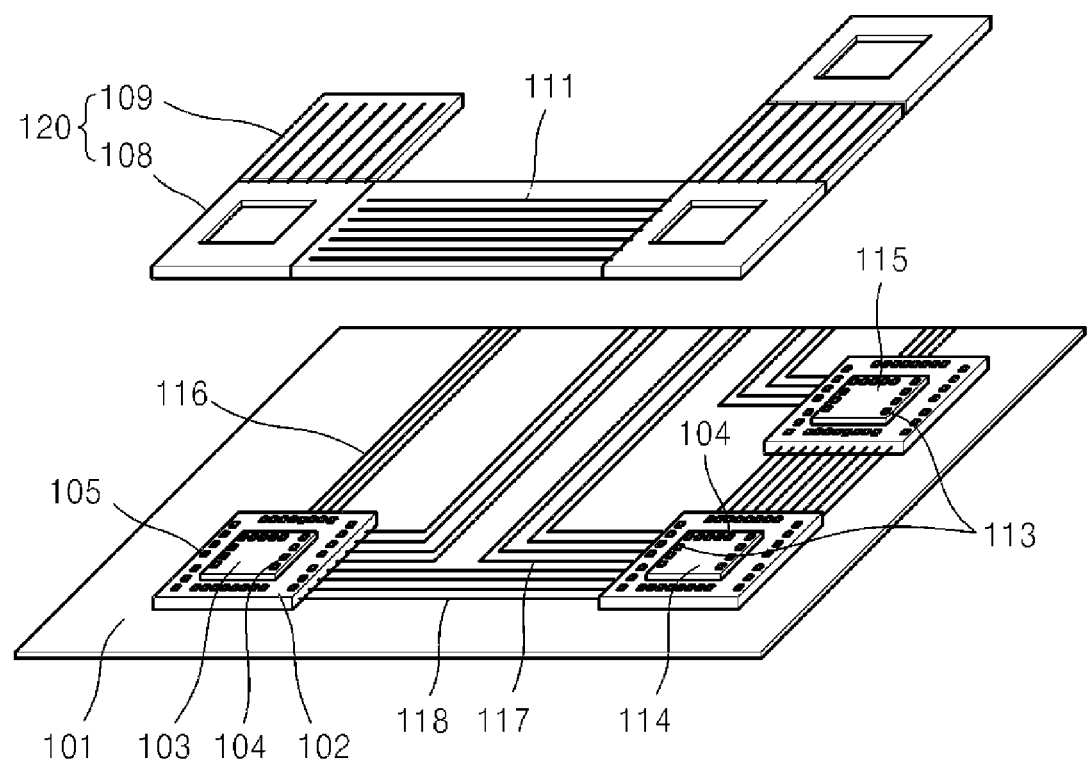
FIG. 5A is a perspective view of an opto-electronic communication module according to yet further another embodiment of the present invention which is optically and electrically connected between a plurality of semiconductor chips using the opto-electronic connector module of FIG. 4A.

Referring to FIG. 1A, an opto-electronic connector module 107 includes an optical waveguide portion 109 having an optical waveguide 111 for optical transmission and a connector portion 108. The connector portion 108 fixes the optical waveguide portion 109 on a printed circuit board (PCB) 101, on which a semiconductor chip portion 119 coupled to the optical waveguide portion 109 and having a light emitting device 104 and a semiconductor chip 103 is mounted. The connector portion 108 has a first coupling portion 110 having a convex structure in the lower portion of the connector portion 108. The opto-electronic connector module 107 is coupled to a second coupling portion 105 having a concave structure formed on the upper surface of the PCB 101 via the first coupling portion 110 of the connector portion 108. As shown in FIG. 3A or 5A, the connector portion 108 is a portion where a semiconductor chip 103 is connected to the opto-electronic connector module 107. An empty space is formed at the central portion of the connector portion 108 so that the semiconductor chip 103 can be inserted therein.

Since the drawings illustrate that the semiconductor chip portion 119 and the opto-electronic connector module 107 are coupled to each other, the semiconductor chip portion 119 and the opto-electronic connector module 107 coupled to the semiconductor chip portion 119 are simply described below. The semiconductor chip portion 119 is fixed by being inserted in a chip fixing plate 102 mounted on the PCB 101 and includes the semiconductor chip 103 and the light emitting device 104. The light emitting device 104 is integrated with the semiconductor chip 103 to form the semiconductor chip portion 119 or separately manufactured and coupled to the side surface of the semiconductor chip 103 to form the semiconductor chip portion 119. The second coupling portion 105 having a concave structure is formed along the edge of the chip fixing plate 102. A connection portion of a second electric wiring 106 formed on the PCB 101 and connected to the semiconductor chip 103 is exposed to a bottom surface of the second coupling portion 105.

The opto-electronic connector module 107 includes the connector portion 108 and the optical waveguide portion 109 as described above. The connector portion 108 and the optical waveguide portion 109 can be manufactured integrally. A first electric wiring 112 for the transfer of an electric signal between the semiconductor chips 103 can be formed in the lower portion of the optical waveguide portion 109. The first electric wiring 112 extends to the bottom surface of the first coupling portion 110 having a convex structure which is formed on the lower surface of the connector portion 108. The opto-electronic connector module 107 having the above structure is fixed at the PCB 101 via the first coupling portion 110 in the lower portion of the connector portion 108 and the second coupling portion 105 on the chip fixing plate 102. The optical and electric connection of the opto-electronic connector module 107 to the semiconductor chip portion 119 is made possible by the first and second coupling portions 110 and 105. That is, the light emitting device 104 and the optical waveguide 111 are vertically and horizontally optical aligned by the coupling of the first and second coupling portions 110 and 105. The semiconductor chip 103 is electrically connected to the first electric wiring in the lower portion of the optical waveguide portion 109 through the second electric wiring 106. The second electric wiring 106 is formed of a polymer material on the PCB 101 and in the chip fixing plate 102 fixing the semiconductor chip portion 119. The second electric wiring 106 is extendable outside the chip fixing plate 102 so that an external signal can be applied. The first and second coupling portions 110 and 105 can have a snap fastener shape to prevent detachment after being coupled to each other. The first and second electric wirings 112 and 106 can be formed of a conductive and flexible material.

The optical waveguide 111 of the optical waveguide portion 109 can be formed as a metal optical waveguide or in a core-clad structure. Considering the overall flexibility of the optical device including the optical waveguide portion and the opto-electronic connector module, the optical waveguide 111 is preferably formed of a flexible material. When the optical waveguide 111 has a core-clad structure, it can be formed of a polymer optical material including a halogen element or heavy hydrogen. When the optical waveguide 111 is formed as a metal optical waveguide, the optical waveguide portion 109 can be formed such that a polymer optical material surrounds the metal optical waveguide.

In general, since the metal optical waveguide can be formed in a very small size compared to the optical waveguide having a core-clad structure, it is preferable to use a metal optical waveguide as an optical waveguide to realize a highly integrated optical communication structure between the semiconductor chips. The function and size of the metal optical waveguide will be described in detail with reference to FIG. 6.

In the present embodiment, the first coupling portion 110 has a convex structure and the second coupling portion 105 has a concave structure. However, it is possible that the first coupling portion 110 has a concave structure and the second coupling portion has a convex structure. Also, when the structures of the first and second coupling portions are changed, the shapes of the first and second electric wirings connected to the first and second coupling portions can be changed.

Referring to FIG. 1B, the opto-electronic connector module 107 formed as the receiving portion can be formed to be the same as the opto-electronic connector module 107 at the transmitting portion of FIG. 1A. However, unlike FIG. 1A, the semiconductor chip portion 119a of the receiving portion includes a light receiving device 113 instead of the light emitting device 104. Most of the contents described in FIG. 1A can be applied to the semiconductor chip portion 119a of the receiving portion and the opto-electronic connector module 107.

The flow of the optical transmission and electric signal transmission will be simply described with reference to FIGS. 1A and 1B. The optical signal generated from the light emitting device 104 of the transmitting portion is transferred to the optical waveguide 111 through the opto-electronic connector module 107 and to the light receiving device 113 through the optical waveguide 111. The electric signal generated from the semiconductor chip 103 of the transmitting portion is transferred to the first electric wiring 112 formed on the bottom surface of the optical waveguide 109 through the second and first coupling portions 105 and 110 and through the second electric wiring 106 formed in the lower portion of the chip fixing plate 102 of the transmitting portion and transferred to the receiving portion along the first electric wiring 112. The electric signal transferred to the receiving portion is finally transferred to the semiconductor chip 103 of the receiving portion through the first and second coupling portions 110 and 105 of the receiving portion and the second electric wiring 106.

Figure 2A:
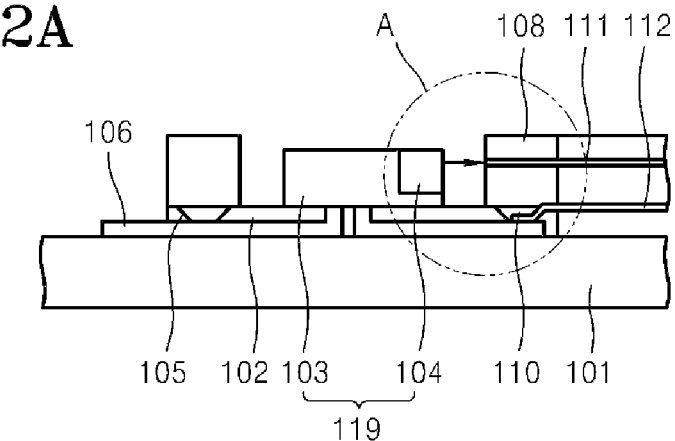
FIGS. 2A-2C are sectional view of the opto-electronic connector module of FIG. 1A or 1B that is optically and electrically connected to a semiconductor chip on a PCB.
Figure 2B:
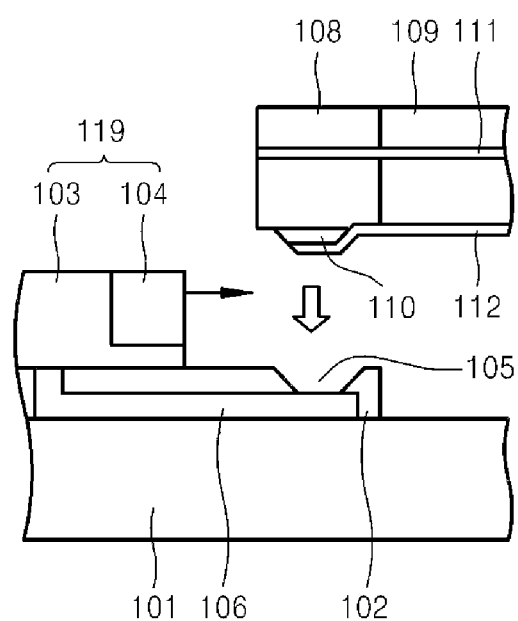
Figure 2C:
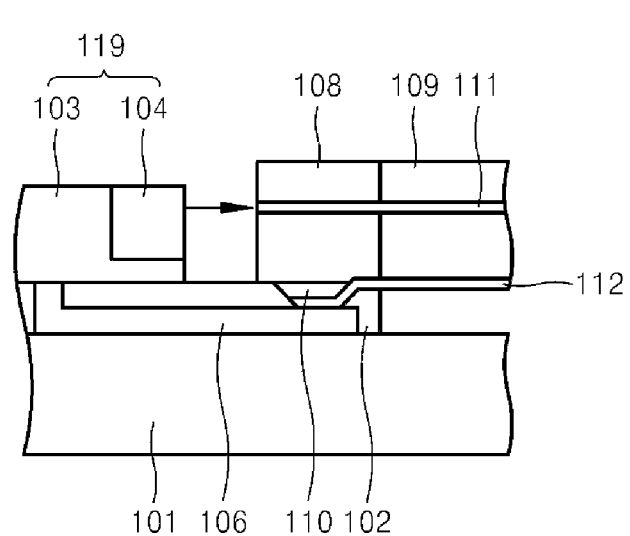

FIGS. 2A-2C are sectional view of the opto-electronic connector module of FIG. 1A or 1B that is optically and electrically connected to a semiconductor chip on a PCB.

FIGS. 2A-2C show the principle of simultaneous optical and electrical connection between the opto-electronic connector module and the semiconductor chip portion in detail. FIG. 2A illustrates a state in which the opto-electronic connector module and the semiconductor chip portion of the transmitting portion are coupled on the PCB as shown in FIG. 1A. FIGS. 2B and 2C illustrate a circled portion indicated by an alternate long and two short dashes line A by enlarging the same. FIG. 2B illustrates a state of the opto-electronic connector module before coupled to the PCB. FIG. 2C illustrates a state of the opto-electronic connector module after coupled to the PCB.

Referring to FIG. 2B, a part of the second electric wiring 106 to transfer the electric signal generated from the semiconductor chip 103 is open to the bottom surface of the second coupling portion 105 having a concave structure and formed at the edge of the chip fixing plate 102 installed on the PCB 101. The light emitting device 104 is formed at the side surface of the semiconductor chip 103. The light emitting device 104 can be integrally with or independently of the semiconductor chip 103 and coupled to the outside of the semiconductor chip 103.

The opto-electronic connector module 107 includes the connector portion 108 and the optical waveguide portion 109. The optical waveguide 111 for optical transmission is formed in the optical waveguide portion 109. The first electric wiring 112 for signal transmission is formed in the lower portion of the optical waveguide portion 109. The first coupling portion 110 having a convex structure is formed on the bottom surface of the connector portion 108. The first electric wiring 112 extends to the bottom and side surfaces of the first coupling portion 110. As the first coupling portion 110 having a convex structure of the opto-electronic connector module is inserted in the second coupling portion 105 having a concave structure on the chip fixing plate 102 in a direction indicated by a thick arrow, the first electric wiring formed on the first coupling portion 110 is automatically connected to the second electric wiring 106 formed on the second coupling portion. Thus, electric signals between the semiconductor chips can be freely exchanged using the first and second electric wirings 112 and 106 connected via the first and second coupling portions 110 and 105.

As shown in FIG. 2C, the optical coupling between the light emitting device 104 of the semiconductor chip portion 119 and the optical waveguide 111 of the opto-electronic connector module 107 can be automatically accomplished in a direction indicated by a black arrow as the first coupling portion 110 of the opto-electronic connector module 107 is inserted in the second coupling portion 105 of the chip fixing plate 102. In detail, by designing in advance the position and height of the first and second coupling portions 110 and 105 such that the vertical and horizontal optical alignment between the light emitting device 104 and the optical waveguide 111 can be automatically guided, when the first and second coupling portions 110 and 105 are coupled to each other, automatic and efficient passive optical coupling is made between the light emitting device 104 and the optical waveguide 111.

Although the transmitting portion is described in the above, the same principle can be applied to the coupling between 119a and the opto-electronic connector module 107 and the semiconductor chip portion including the receiving device, that is, the light receiving device 113.

FIG. 3A is a perspective view of an opto-electronic communication module according to another embodiment of the present invention which is optically and electrically connected between a plurality of semiconductor chips using the opto-electronic connector module of FIG. 2A. FIG. 3A shows that the optical communication and electrical communication among the first semiconductor chip 103, a second semiconductor chip 114, and a third semiconductor chip 115 can be completed at the same time.

Referring to FIG. 3A, the opto-electronic communication module includes the PCB 101, the semiconductor chips portion having the opto-electronic device 104 or 113 and the semiconductor chips 103, 114, and 115 mounted on the PCB 101, and the opto-electronic connector module 107 having the optical waveguide portion 109 and the connector portion 108. The opto-electronic communication module 107 can be configured to be the same as that of FIG. 1 or 2. Also, the chip fixing plate 102 of the PCB 101 and the second coupling portion 105 of the chip fixing plate 102 can be configured to be the same as those of FIG. 1 or 2. In the meantime, the semiconductor chip portion can be configured with devices selected from a semiconductor communication device group including an opto-electronic device, an optical device drive, an amplifier, a microprocessor, a microprocessor chipset, a memory, and a network support chipset. The respective devices selected from the semiconductor communication device group can be configured in form of a set of unit chips or a unit chipset integrating the devices.

In the function of the opto-electronic communication module, by the coupling of the second coupling portion 105 having a concave structure formed on the chip fixing plate 102 fixing the semiconductor chips 103, 114, and 115 and the first coupling portion 110 (not shown) having a convex structure formed on the bottom surface of the connector portion 108 of the opto-electronic communication module 107, the optical coupling between the opto-electronic device (light device) 104 or 113 of the semiconductor chips 103, 114, and 115 and the optical waveguide 111 is automatically completed. Also, the first electric wiring 112 and the second electric wiring (not shown) respectively formed on the first coupling portion 110 (not shown) and the second coupling portion 105 are automatically connected so that the electric communication between the first, second, and third semiconductor chips 103, 114, and 115 can be realized.

In detail, assuming that the electric signal applied to the first semiconductor chip 103 through the third electric wiring 116 formed on the PCB 101 consists of a light emitting signal and a chip operation signal, the first semiconductor chip 103 receiving the light emitting signal makes the light emitting device 104 generate the first optical signal. The generated first optical signal is transferred to the second semiconductor chip 114 through the optical waveguide 111 of the opto-electronic connector module 107. The second semiconductor chip 114 receives the first optical signal through the light receiving device 113 and converts the first optical signal to a light emitting signal to operate the light emitting device 104 through internal operation. The light emitting device 104 on the second semiconductor chip 114 is operated by the light emitting signal so that the second optical signal is generated. The generated second optical signal is transferred to the light receiving device 13 on the third semiconductor chip 115 through the optical waveguide 111 of the opto-electronic connector module 107. The light emitting signal of the second semiconductor chip 114 can be reconfigured by a combination or other new operation of the light emitting signal applied through a fourth electric wiring 117 and the internal operation signal of the first optical signal received from the first semiconductor chip 103. The optical communication between the first, second, and third semiconductor chips 103, 114, and 115 is completed by the above principle.

In the electric communication among the first, second, and third semiconductor chips 103, 114, and 115, the operation signal applied to the first semiconductor through the third electric wiring 116 is appropriately operated by a component circuit and a component semiconductor circuit of the first semiconductor chip 103. According to the result of operation, the first semiconductor chip 103 generates a first operation result signal. The first operation result signal generated from the first semiconductor chip 103 is transferred to the bottom surface of the second coupling portion 105 having a concave structure through the second electric wiring (not shown) provided in the lower portion of the chip fixing plate 102. The first operation result signal is transferred to the first electric wiring 112 formed in the lower portion of the optical waveguide portion 109 through the first coupling portion 110 having a convex structure coupled to the second coupling portion 105 and to the opto-electronic connector module 107 in the second semiconductor chip 114 along the first electric wiring 112. The first operation result signal is transferred to the second semiconductor chip 114 through the first coupling portion of the opto-electronic connector module, the second coupling portion of the chip fixing plate, and the second electric wiring in the lower portion of the chip fixing plate. The transferred first operation result signal is processed by the operation circuit of the second semiconductor chip 114. A second operation result signal generated by being processed by the second semiconductor chip 114 is transferred to the third semiconductor chip 115 along the electric wiring connection circuit. In the meantime, the second operation result signal of the second semiconductor chip 114 can be reconfigured by the first operation result signal received from the first semiconductor chip 103 and a new operation signal received from the fourth electric wiring 117. The electric communication between the first, second, and third semiconductor chips 103, 114, and 115 is completed by the above principle.

Figure 3B:
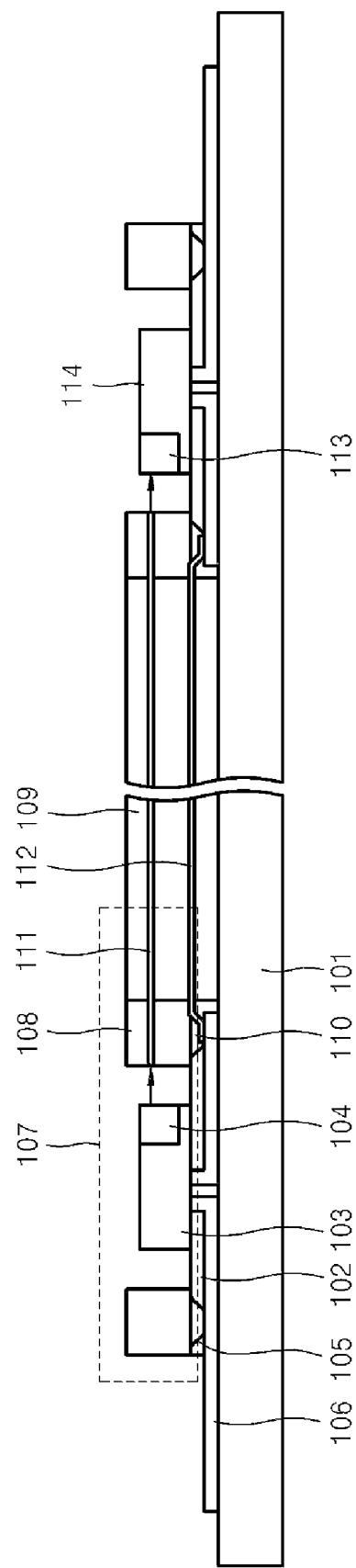
FIG. 3B is a sectional view of an opto-electronic communication module that is optically and electrically connected to a semiconductor chip after the opto-electronic connector module of FIG. 2A is coupled between the semiconductor chips.

FIG. 3B is a sectional view of an opto-electronic communication module that is optically and electrically connected to a semiconductor chip after the opto-electronic connector module of FIG. 2A is coupled between the semiconductor chips. Referring to FIG. 3B, an optical signal is output from the light emitting device 104 of the first semiconductor chip 103 and transferred to the light receiving device 113 on the second semiconductor chip 114 through the connector portion 108 and the optical waveguide 111 of the optical waveguide portion 109. For an electric signal, the electric signal from the first semiconductor chip 103 is transferred to the second semiconductor chip 114 through the electric wiring between the first semiconductor chip 103 and the second semiconductor chip 114, that is, the second electric wiring 106, the second and first coupling portion 105 and 110, and the first electric wiring 112 of the first semiconductor chip 103 region and via the first and second coupling portions 110 and 105 and the second electric wiring 106 of the second semiconductor chip 114 region.

Figure 4A:
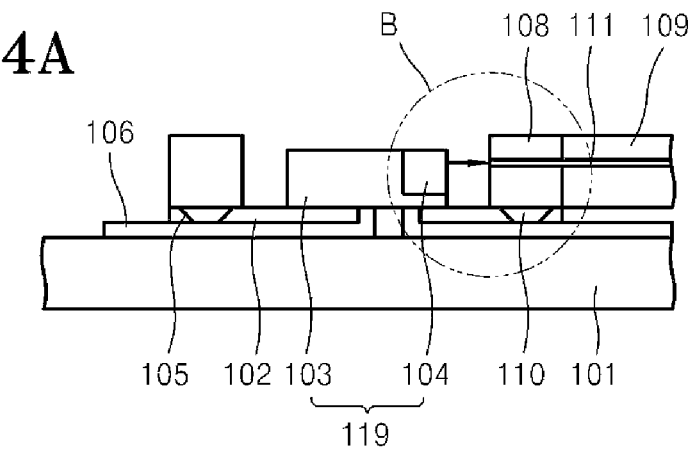
FIGS. 4A-4C are sectional views of an opto-electronic connector module according to yet another embodiment of the present invention that is optically and electrically connected to a semiconductor chip on a PCB.
Figure 4B:
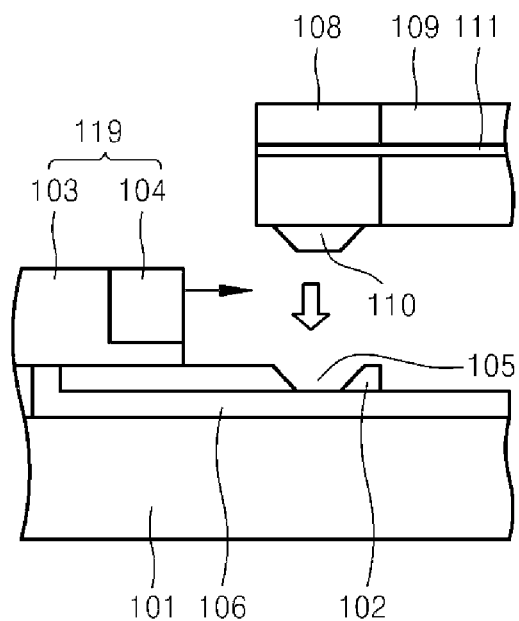
Figure 4C:
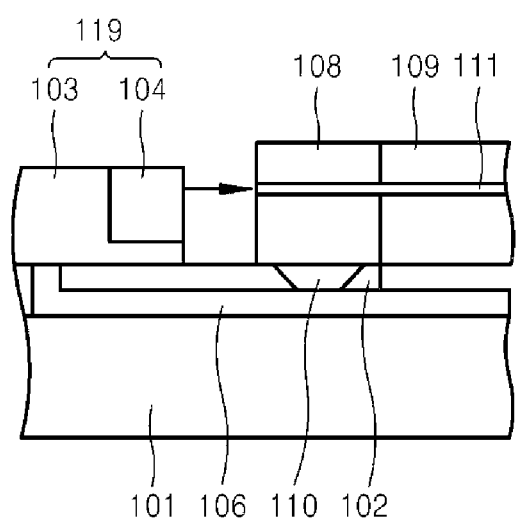

FIGS. 4A through 4C are sectional views of an opto-electronic connector module according to yet another embodiment of the present invention that is optically and electrically connected to a semiconductor chip on a PCB. FIG. 4A illustrates that the semiconductor chip portion 119 of the transmitting portion is coupled to the opto-electronic connector module on the PCB 101 as shown in FIG. 2A. FIGS. 4B and 4C illustrate a circled portion indicated by an alternate long and two short dashes line B by enlarging the same. FIG. 4B illustrates a state of the opto-electronic connector module before coupled to the PCB 101. FIG. 4C illustrates a state of the opto-electronic connector module after coupled to the PCB 101.

Referring to FIG. 4A, in the opto-electronic connector module of the present embodiment, the first electric wiring is not formed in the lower portion of the optical waveguide portion 109 unlike FIG. 1A or 2A. Instead, the first electric wiring is connected to the second electric wiring 106 and formed on the PCB 101. Accordingly, the first electric wiring is not formed at the first coupling portion 110 in the lower portion of the opto-electronic connector module.

Referring to FIG. 4B, a part of the second electric wiring 106 is open to the bottom surface of the second coupling portion 105 having a concave structure at the edge of the chip fixing plate 102 like the structure shown in FIG. 2B. The light emitting device 104 is formed at the side surface of the semiconductor chip 103. In the meantime, for the opto-electronic connector module, the optical waveguide 111 for optical transmission is formed in the optical waveguide portion 109 as described above. However, the first electric wiring is not formed at the opto-electronic connector module. Accordingly, the first electric wiring is not formed at the first coupling portion 110 having a convex structure at the bottom surface of the connector portion 108. Thus, the coupling of the semiconductor chip portion 119 and the opto-electronic connector module 107 through the first and second coupling portions 110 and 105 manages only the function of automatic and efficient passive optical coupling between the light emitting device 104 and the optical waveguide 111.

As it is shown in FIG. 4B or 4C, the first electric wiring for the electric communication between semiconductor chips is realized as the second electric wiring 106 extends on the PCB 101. The shape of the first electric wiring can be shown in detail in FIG. 5.

Except for the first electric wiring, most of the contents described with reference to FIG. 2 can be applied to the present embodiment. For example, the positions and heights of the first and second coupling portions 110 and 105 can be designed such that the vertical and horizontal optical alignments between the light emitting device 104 and the optical waveguide 111 can be automatically guided. Meanwhile, the same principle can be applied to not only the transmitting portion but also the coupling of the receiving portion, that is, the semiconductor chip portion 119 including the light receiving device and the opto-electronic connector module.

FIG. 5A is a perspective view of an opto-electronic communication module according to yet further another embodiment of the present invention which is optically and electrically connected between a plurality of semiconductor chips using the opto-electronic connector module of FIG. 4A. Referring to FIG. 5A, in the opto-electronic communication module according to the present embodiment, an opto-electronic connector module 120 is configured with only the optical waveguide 111 for the transmission of an optical signal, excluding electric wiring for the electric communication between semiconductor chips. In detail, a first coupling portion (not shown) having a convex structure is formed at the bottom surface of the connector portion 108 of the opto-electronic connector module 120. The second coupling portion 105 having a concave structure is formed at the edge of the chip fixing plate 102 mounted on the PCB 101. Also, a light emitting device 104 is formed at the side surface of the semiconductor chip. As the first coupling portion is inserted in the second coupling portion 105 of the chip fixing plate 102, the vertical and horizontal optical alignments between the light emitting device 104 and the optical waveguide 111 in the opto-electronic connector module 120 are guided and the optical communication between the semiconductor chips 103, 114, and 115 are made possible. The optical communication can be performed among the semiconductor chips 103, 114, and 115 with the same principle as described above with reference to FIG. 3A.

The first electric wiring 118 is not formed as the opto-electronic connector module 120 and is directly connected to the second electric wiring (not shown) and formed on the PCB 101, unlike that in FIG. 3A. Thus, for except for that the first electric wiring 118 formed on the PCB 101 is used, the electric communication can be performed among the semiconductor chips 103, 114, and 115 with the same principle as described above with reference to FIG. 3A.

Figure 5B:
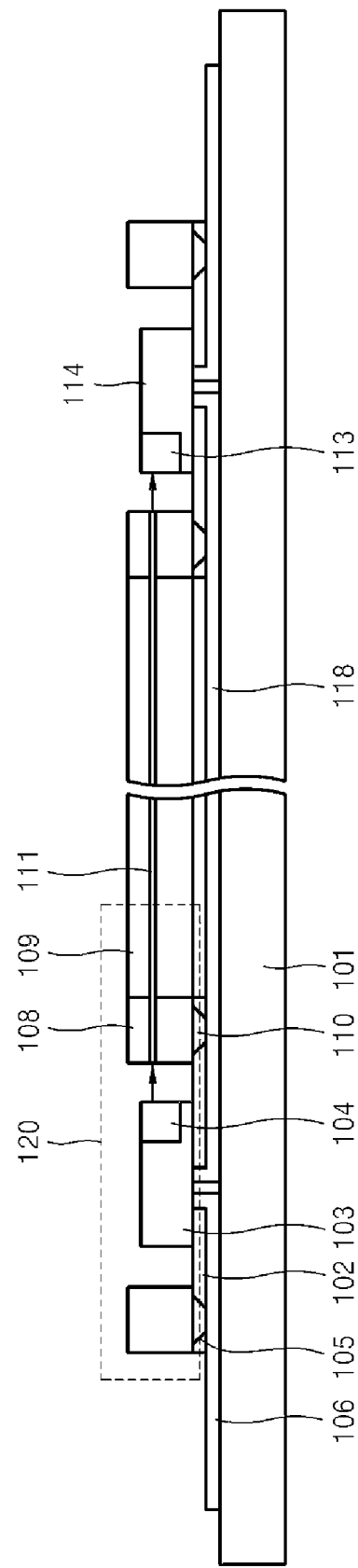
FIG. 5B is a sectional view of an opto-electronic communication module that is optically and electrically connected to a semiconductor chip after the opto-electronic connector module of FIG. 4A is coupled between the semiconductor chips.

FIG. 5B is a sectional view of an opto-electronic communication module that is optically and electrically connected to a semiconductor chip after the opto-electronic connector module of FIG. 4A is coupled between the semiconductor chips. It can be seen from FIG. 5B that the optical communication and electric communication can be simultaneously performed between the semiconductor chips 103 and 114.

Figure 6A:
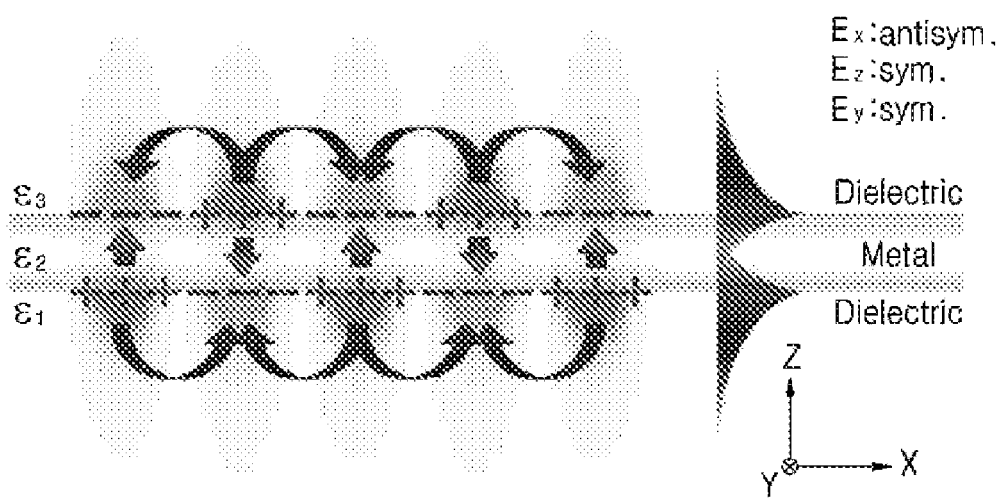
FIGS. 6A and 6B are images for explaining the optical coupling and optical transmission principle of a metal optical waveguide used for the opto-electronic connector module of FIGS. 1 through 5.
Figure 6B:
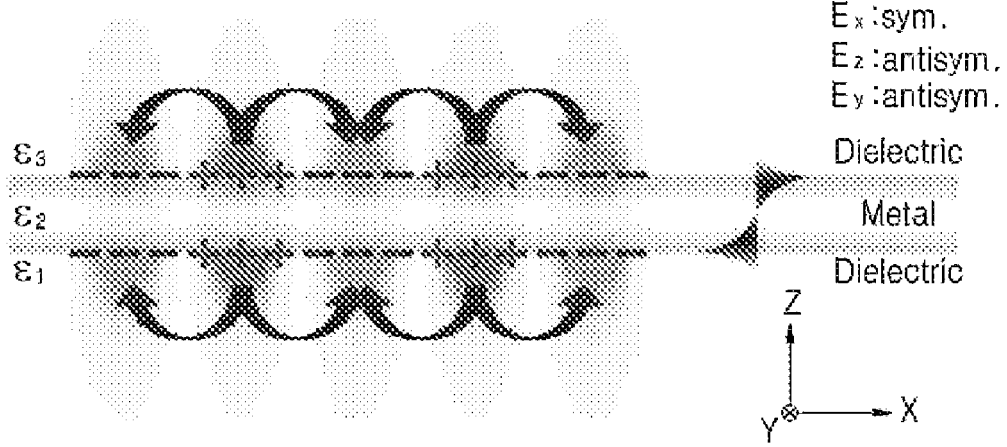

FIGS. 6A and 6B are images for explaining the optical coupling and optical transmission principle of a metal optical waveguide used for the opto-electronic connector module of FIGS. 1 through 5. A metal line included in a dielectric is thin and has a width of tens of microns and is capable of transmitting incident light to a distance of several centimeters. An optical waveguide using the metal wire is referred to as a metal optical waveguide. The metal optical waveguide has a fine size, for example, a size of a metal wire having a thickness of 5 through 200 nm and a width of 2 through 100 μm and is capable of sufficiently transmitting an optical signal.

In the optical waveguide principle of the metal optical waveguide, an optical signal is transferred through a free electron polarization in the metal wire and the mutual coupling of the free electron polarization. The continuous coupling of the free electron polarization is referred to as surface plasmon polariton. The long-distance optical transmission using the surface plasmon polariton is theoretically referred to as long-range surface plasmon polariton. FIG. 6A shows a state in which the polarization of free electrons is appropriately formed so that an optical signal is smoothly transmitted. FIG. 6B shows a state in which the polarization of free electrons is inappropriately formed so that an optical signal is not smoothly transmitted. That is, when the TM mode Ex in the x-axis direction is antisymmetry through the polarization of free electrons, optical transmission is smoothly performed. The intensity of the transmitted optical signal is schematically shown in the right side of each of the FIGS. 6A and 6B. It can be seen that the transmission of the optical signal in FIG. 6A is smoother than that in FIG. 6B. the dielectric constants $\in_1$ and $\in_3$ of the dielectric in the upper and lower portions of the metal wire may be either different or the same. Thus, the metal optical waveguide can be formed in form of surrounding the metal wire with the same dielectric.

Since the metal optical waveguide can be formed in a fine size as described above, by using the metal optical waveguide for the above-described opto-electronic connector module, the size of the opto-electronic communication module can be greatly reduced. Accordingly, a degree of the channel integration of the opto-electronic communication module can be greatly improved.

As describe above, since the opto-electronic connector module according to the present invention is coupled to the semiconductor chip through the first and second coupling portions having concave and convex structures, the automatic optical alignment between the opto-electronic device and the optical waveguide is made possible so that the optical communication structure between the semiconductor chips can be easily realized.

Also, the opto-electronic communication module according to the present invention includes electric wiring capable of transferring an electric signal on the opto-electronic connector module or PCB. Thus, an opto-electronic communication module capable of simultaneously and efficiently performing the optical and electric communications between the semiconductor chips.

Furthermore, the opto-electronic communication module according to the present invention uses the metal optical waveguide using the long-range surface plasmon polariton as the optical waveguide in the opto-electronic connector module. Thus, the waveguide can be manufactured to have the overall thickness to be less than tens of microns, compared to the conventional core-clad based optical waveguide structure having a thickness of several hundreds of microns. Thus, a degree of channel integration of the opto-electron communication module can be greatly improved.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. An opto-electronic connector module comprising:
an optical waveguide portion including an optical waveguide in which an optical signal is transmitted between a first semiconductor chip and a second semiconductor chip, the optical waveguide portion further including a first electric line in which an electric signal is transmitted between the first semiconductor chip and the second semiconductor chip; and
a connector portion joined to the optical waveguide portion, fixing the optical waveguide portion on a PCB on which a semiconductor chip portion having an opto-electronic device and the first semiconductor chip is surface-mounted, and having a first connecting portion having a convex or concave structure formed in a lower portion thereof,
wherein the first connecting portion of the connector portion is connected to a second connecting portion having a concave or convex structure formed on an upper surface of the PCB, and
wherein the first electric line is formed in a lower portion of the optical waveguide portion,
wherein the first electric line extends to the first connecting portion, such that the first electric line is disposed on a bottom surface of the first connecting portion, the bottom surface facing the PCB, and
wherein a further optical waveguide, directly connected to the optical waveguide of the optical waveguide portion, is disposed in the connector portion.

2. The opto-electronic connector module of claim 1, wherein the first electric line comes in direct contact with a second electric line that is formed on the upper surface of the PCB.

3. The opto-electronic connector module of claim 1, wherein the optical waveguide portion is fixed to the PCB by connecting the first connecting portion to the second connecting portion, and the optical waveguide is vertically and horizontally aligned to the opto-electronic device.

4. The opto-electronic connector module of claim 1, wherein the optical waveguide is a metal optical waveguide or a core-clad based optical waveguide.

5. The opto-electronic connector module of claim 4, wherein the optical waveguide is flexible.

6. The opto-electronic connector module of claim 1, wherein the optical waveguide portion includes a metal optical waveguide in which an optical signal is transferred and a polymer optical material enclosing the metal optical waveguide.

7. The opto-electronic connector module of claim 6, wherein the metal optical waveguide has a thickness of 5 through 200 nm and a width of 2 through 100μm.

8. The opto-electronic connector module of claim 1, wherein the optical waveguide is a core-clad based optical waveguide and the core-clad based optical waveguide is formed of a polymer optical material including a halogen element or heavy hydrogen.

9. The opto-electronic connector module of claim 1, wherein the second connecting portion is formed on a chip fixing plate that is formed on an upper surface of the PCB and fixes the semiconductor chip portion by mounting the semiconductor chip portion on the PCB, and wherein the connector portion is disposed directly on the chip fixing plate to cover the chip fixing plate, and the entire optical waveguide portion is disposed in a region that does not cover the chip fixing plate.

10. The opto-electronic connector module of claim 9, wherein the first connecting portion of the connector portion and the second connecting portion of the chip fixing plate have a snap fastener structure to prevent detachment after the first and second connection portions are connected to each other.

11. The opto-electronic connector module of claim 1, wherein the connector portion has a top surface and a side surface, and wherein the optical waveguide portion is fixed to the connector portion in a horizontal direction, so that the optical waveguide portion is fixed to and comes in contact with the side surface of the connector portion, while the top surface of the connector portion is not in contact with the optical waveguide portion, and wherein the first connecting portion is electrically non-conductive.

12. The opto-electronic connector module of claim 1, wherein the connector portion has a single bottom surface extending without discontinuity, the single bottom surface having a first part corresponding the convex or concave structure and a second part surrounding the first region, the first part being disposed at a level that is lower or higher than the second part, and wherein the first connecting portion is electrically non-conductive.

13. The opto-electronic connector module of claim 1, wherein the first electric line in the optical waveguide portion further extends to a lower surface of the connector portion having a convex or concave structure.

14. An opto-electronic communication module comprising:
a PCB;
a semiconductor chip portion including a first semiconductor chip and an opto-electronic device mounted on the PCB; and
an opto-electronic connector module including:
an optical waveguide portion including an optical waveguide in which an optical signal is transmitted between the first semiconductor chip and a second semiconductor chip, and further including a first electric line in which an electric signal is transmitted between the first semiconductor chip and the second semiconductor chip, and a connector portion coupled to the optical waveguide portion, fixing the optical waveguide portion on the PCB and having a first connecting portion having a convex or concave structure formed in a lower portion thereof, wherein the first connecting portion of the connector portion is connected to a second connecting portion having a concave or convex structure formed on an upper surface of the PCB, wherein a first electric line capable of transferring an electric signal of the semiconductor chip portion is formed directly on a bottom surface of the optical waveguide portion and extends to the first connecting portion, such that the first electric line is disposed on a bottom surface of the first connecting portion, the bottom surface facing the PCB, and wherein a further optical wavequide, directly connected to the optical waveguide of the optical wavequide portion, is disposed in the connector portion.

15. The opto-electronic communication module of claim 14, wherein the opto-electronic device is a light emitting device or a light receiving device, and the semiconductor chip portion is configured as the opto-electronic device is integrated with a semiconductor chip or the opto-electronic device is separately manufactured and coupled to the semiconductor chip.

16. The opto-electronic communication module of claim 14, wherein the semiconductor chip portion is formed of devices selected from a semiconductor communication device group consisting of the opto-electronic device, an optical device drive, an amplifier, a microprocessor, a microprocessor chipset, a memory, and a network support chipset, and the semiconductor chip portion is configured in form of a set of unit chips of devices selected from the semiconductor communication device group or in a unit chipset in which the respective devices are integrated together.

17. The opto-electronic communication module of claim 14, further comprising a chip fixing plate formed on an upper surface of the PCB, mounting and fixing the semiconductor chip portion on the PCB, and having the second connecting portion formed thereon, and wherein the connector portion is disposed directly on the chip fixing plate to cover the chip fixing plate, and the optical waveguide portion is disposed in a region that does not cover the chip fixing plate.

18. The opto-electronic communication module of claim 17, wherein the chip fixing plate is formed of polymer.

19. The opto-electronic communication module of claim 17, wherein the first connecting portion of the connector portion and the second connecting portion of the chip fixing plate have a snap fastener structure to prevent detachment after the first and second connection portions are connected to each other.

20. The opto-electronic communication module of claim 14, wherein the first electric line comes in direct contact with a second electric line that is formed on the upper surface of the PCB.

21. The opto-electronic communication module of claim 20, further comprising a chip fixing plate formed on the upper surface of the PCB, fixing the semiconductor chip portion by mounting the semiconductor chip portion on the PCB, and having the second connecting portion formed thereon, wherein the second electric line is formed in the chip fixing plate, and wherein the connector portion is disposed directly on the chip fixing plate to cover the chip fixing plate, and the entire optical waveguide portion is disposed in a region that does not cover the chip fixing plate.

22. The opto-electronic communication module of claim 21, wherein the second electric line extends outside the chip fixing plate so that an external signal is applied to the second electric line.

23. The opto-electronic communication module of claim 14, wherein the connection of the first connection portion to the second connection portion fixes the optical waveguide portion at the PCB and allows the optical waveguide to be vertically and horizontally aligned with respect to the electronic device.

24. The opto-electronic communication module of claim 14, wherein the optical waveguide is a metal optical waveguide or a core-clad based optical waveguide.

25. The opto-electronic communication module of claim 24, wherein the optical waveguide is flexible.

26. The opto-electronic communication module of claim 24, wherein the optical waveguide portion includes a metal optical waveguide in which an optical signal is transferred and a polymer optical material enclosing the metal optical waveguide.

27. The opto-electronic communication module of claim 26, wherein the metal optical waveguide has a thickness of 5 through 200 nm and a width of 2 through 100μm.

28. The opto-electronic communication module of claim 24, wherein the optical waveguide is a core-clad based optical waveguide and the core-clad based optical waveguide is formed of a polymer optical material including a halogen element or heavy hydrogen.

29. An opto-electronic connector module comprising:
an optical waveguide portion including an optical waveguide in which an optical signal is transmitted between a first semiconductor chip and a second semiconductor chip, and further including a first electric line in which an electric signal is transmitted between the first semiconductor chip and the second semiconductor chip;
a PCB;
a semiconductor chip portion having an opto-electronic device and the first semiconductor chip;
a chip fixing plate formed on the PCB, and fixing the semiconductor chip portion by mounting the semiconductor chip portion on the PCB;
a connector portion joined to the optical waveguide portion and fixing the optical waveguide portion on the PCB, a lower surface of the connector portion having a convex or concave region, an upper surface of the chip fixing plate having a concave or convex region corresponding to the convex or convex region of the connector portion, the convex or concave region of the connector region being joined to the corresponding concave or convex region of the chip fixing plate,
wherein the first electric line is formed directly on and in contact with a bottom surface of the optical waveguide portion and extends in a direction along the optical waveguide, and further extends on a bottom surface of the convex or concave region of the connector portion, the bottom surface being a surface that faces the PCB,
wherein a further optical wavequide, directly connected to the optical wavequide of the optical waveguide portion, is formed within the connector portion, and
wherein the connector portion is disposed directly on the chip fixing plate to cover the chip fixing plate, and the entire optical waveguide portion is disposed in a region that does not cover the chip fixing plate.

30. An opto-electronic connector module comprising:
an optical waveguide portion including an optical waveguide in which an optical signal is transmitted between a first semiconductor chip and a second semiconductor chip, and further including a first electric line in which an electric signal is transmitted between the first semiconductor chip and the second semiconductor chip; and
a connector portion joined to the optical waveguide portion, fixing the optical waveguide portion on a PCB on which a semiconductor chip portion having an opto-electronic device and the first semiconductor chip is surface-mounted, and having a first connecting portion having a convex or concave structure formed in a lower portion thereof,
wherein the first connecting portion of the connector portion is connected to a second connecting portion having a concave or convex structure formed on an upper surface of the PCB,
wherein the first electric circuit is formed in a lower portion of the optical waveguide portion, and is further formed on a bottom surface of the first connecting portion that faces the PCB,
wherein a further optical wavequide, directly connected to the optical wavequide of the optical waveguide portion, is formed within the connector portion, and
wherein by connecting the first connecting portion to the second connecting portion, the optical waveguide portion is fixed to the PCB, the optical waveguide is vertically and horizontally aligned to the opto-electronic device, the first electric circuit is interposed between the bottom surface of the first connection portion and a top surface of the second connecting portion, and the first electric circuit is electrically connected to the first semiconductor chip.

31. An opto-electronic communication module comprising:
a PCB;
a semiconductor chip portion including a first semiconductor chip and an opto-electronic device mounted on the PCB; and
an opto-electronic connector module including an optical waveguide portion including an optical waveguide in which an optical signal is transmitted between the first semiconductor chip and a second semiconductor chip and a first electric line in which an electric signal is transmitted between the first semiconductor chip and the second semiconductor chip, the opto-electric connector module further including a plate-shaped connector portion joined to the optical waveguide portion, fixing the optical waveguide portion on the PCB and having a first connecting portion having a convex or concave structure formed in a lower portion thereof,
wherein the first connecting portion of the connector portion is connected to a second connecting portion having a concave or convex structure formed on an upper surface of the PCB,
wherein the first electric circuit is formed directly on a bottom surface of the optical waveguide portion, and is further formed on a bottom surface of the first connecting portion that faces the PCB,
wherein a further optical wavequide, directly connected to the optical wavequide of the optical waveguide portion, is formed within the connector portion, and wherein by connecting the first connecting portion to the second connecting portion, the optical waveguide portion is fixed to the PCB, the optical waveguide is vertically and horizontally aligned to the opto-electronic device, the first electric circuit is interposed between the bottom surface of the first connection portion and a top surface of the second connecting portion, and the first electric circuit is electrically connected to the first semiconductor chip.

* * * * *